(12) United States Patent
He et al.

(10) Patent No.: US 12,189,222 B2
(45) Date of Patent: Jan. 7, 2025

(54) DIMMING DEVICE AND DISPLAY DEVICE

(71) Applicant: Wuhan China Star Optoelectronics Technology Co., Ltd., Hubei (CN)

(72) Inventors: Rui He, Hubei (CN); Xindong Mei, Hubei (CN); Wenlong Ye, Hubei (CN); Qian Deng, Hubei (CN); Wei Cheng, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,334

(22) PCT Filed: Dec. 22, 2021

(86) PCT No.: PCT/CN2021/140343
§ 371 (c)(1),
(2) Date: Dec. 28, 2021

(87) PCT Pub. No.: WO2023/108743
PCT Pub. Date: Jun. 22, 2023

(65) Prior Publication Data
US 2024/0069369 A1 Feb. 29, 2024

(30) Foreign Application Priority Data
Dec. 16, 2021 (CN) .......................... 202111546873.9

(51) Int. Cl.
G02F 1/13 (2006.01)
G02F 1/1334 (2006.01)
G02F 1/1335 (2006.01)

(52) U.S. Cl.
CPC ........ *G02F 1/1323* (2013.01); *G02F 1/13345* (2021.01); *G02F 1/133528* (2013.01)

(58) Field of Classification Search
None
See application file for complete search history.

(56) References Cited

U.S. PATENT DOCUMENTS

2014/0002761 A1   1/2014   Heo et al.

FOREIGN PATENT DOCUMENTS

| CN | 109298569 | | 2/2019 |
|---|---|---|---|
| CN | 110456538 | | 11/2019 |
| CN | 214174772 | | 9/2021 |
| CN | 214174772 U | * | 9/2021 |
| CN | 113552741 | | 10/2021 |
| WO | WO-2023015645 A1 | * | 2/2023 |

* cited by examiner

*Primary Examiner* — Phu Vu (57) ABSTRACT

A display device and a dimming device are provided. A dimming layer is located between a first polarizer and a second polarizer whose transmission axes are parallel to each other. When the display device is in a first display mode, long axes of the liquid crystal molecules distributed in the first polymer network are arranged along the second direction, and long axis of the liquid crystal molecules distributed in the second polymer network are arranged along the third direction. The third direction and the second direction respectively point to opposite sides of a normal line of the first polarizer.

19 Claims, 5 Drawing Sheets

DIMMING DEVICE AND DISPLAY DEVICE

RELATED APPLICATIONS

This application is a National Phase of PCT Patent Application No. PCT/CN2021/140343 having International filing date of Dec. 22, 2021, which claims the benefit of priority of Chinese Patent Application No. 202111546873.9 filed on Dec. 16, 2021. The contents of the above applications are all incorporated by reference as if fully set forth herein in their entirety.

FIELD AND BACKGROUND OF THE INVENTION

The present disclosure relates to the field of display technologies, and particularly to a dimming device and a display device.

In the fast-developing information age, people begin to pay more and more attention to protection of personal information. Therefore, the display with anti-peep function emerge as the times demand. This type of display can only make the display content readable for users with a front viewing angle, while the display content cannot be seen by onlookers at the side, which effectively protects the user's information privacy.

Therefore, it is necessary to put forward a technical scheme to realize an anti-peeping function of a display device.

SUMMARY OF THE INVENTION

The present disclosure provides a dimming device and a display device to ensure that the display device displays normally at a front viewing angle, while reducing a difference of anti-peeping effects at different positions and better achieving the anti-peeping effect.

To solve the above technical problems, the technical solutions provided by the disclosure as follows.

A display device, the display device comprising:
a display panel;
a first polarizer, located on a light-emitting side of the display panel;
a dimming layer disposed on a side of the first polarizer away from the display panel, wherein the dimming layer comprises at least one first area and at least one second area alternately arranged along a first direction, and the first direction is perpendicular to a thickness direction of the dimming layer, and the dimming layer comprises:
a first polymer network liquid crystal, located in the first area of the dimming layer and comprising a first polymer network arranged along a second direction and liquid crystal molecules distributed in the first polymer network, wherein the second direction is inclined with respect to the normal line of the first polarizer; and
a second polymer network liquid crystal, located in the second area of the dimming layer and comprising a second polymer network arranged along a third direction and liquid crystal molecules distributed in the second polymer network, wherein the third direction is inclined with respect to the normal line of the first polarizer, and the third direction and the second direction point to opposite sides of the normal line of the first polarizer; wherein
a second polarizer is located on a side of the dimming layer away from the first polarizer, and a light transmission axis of the second polarizer is parallel to a light transmission axis of the first polarizer;
wherein when the display device is in a first display mode, long axes of the liquid crystal molecules distributed in the first polymer network are arranged along the second direction and long axes of the liquid crystal molecule distributed in the second polymer network are arranged along the third direction A dimming device, the dimming device has a first mode, and the dimming device comprising:
a first polarizer;
a dimming layer arranged on one side of the first polarizer, and the dimming layer comprising at least one first area and at least one second area alternately arranged along a first direction, wherein the first direction is perpendicular to a thickness direction of the dimming layer, and the dimming layer comprises:
a first polymer network liquid crystal, located in the first area of the dimming layer and comprising a first polymer network arranged along a second direction and liquid crystal molecules distributed in the first polymer network, wherein the second direction is inclined with respect to the normal line of the first polarizer; and
a second polymer network liquid crystal, located in the second area of the dimming layer and comprising a second polymer network arranged along a third direction and liquid crystal molecules distributed in the second polymer network, the third direction is inclined with respect to the normal line of the first polarizer, and the third direction and the second direction point to opposite sides of the normal line of the first polarizer; and
a second polarizer, locating on a side of the dimming layer away from the first polarizer, and a light transmission axis of the second polarizer is parallel to a light transmission axis of the first polarizer;
wherein when the dimming device is in the first mode, long axes of the liquid crystal molecules distributed in the first polymer network are arranged along the second direction and long axes of the liquid crystal molecule distributed in the second polymer network are arranged along the third direction.

Advantageous effects: The present application provides a dimming device and a display device. A dimming layer is located between the first polarizer and the second polarizer whose transmission axes are parallel to each other. When the display device is in a first display mode, long axes of the liquid crystal molecules distributed in a first polymer network are arranged along the second direction, and long axes of the liquid crystal molecules distributed in the second polymer network are arranged along the third direction. The third direction and the second direction are respectively point to opposite sides of the normal line of the first polarizer. The dimming layer adjusts phase of the light whose propagation direction deviates from the normal lines direction of the first polarizer and the second polarizer, and the dimming layer does not adjust phase of light whose propagation direction is parallel to the normal lines direction of the first polarizer and the second polarizer. The light that causes the propagation direction to deviate from the normal line direction of the first polarizer and the second polarizer is at least partially intercepted by the second polarizer after phase adjustment, and the propagation direction is the same as the normal direction of the first polarizer and the second polarizer, to ensure the normal display of the front viewing angle. In addition, since the long axes of the liquid crystal molecules located in the first area are arranged along the second direction and the long axes of the liquid crystal molecules located in the second area are arranged along the third direction, the second direction and the third direction respectively point to opposite sides of the normal line of the first polarizer, so that the dimming layer has a self-compensating effect and improves the difference in anti-peeping effects at different positions.

BRIEF DESCRIPTION OF THE SEVERAL VIEW OF THE DRAWINGS

In order to explain embodiments or technical solutions in the prior art more clearly, the following will briefly introduce drawings involved in a following description of the embodiments or the prior art. Obviously, the drawings in the following description are merely inventions. Those of ordinary skill in the art can obtain other drawings based on these drawings without creative work.

DETAILED DESCRIPTION OF SPECIFIC EMBODIMENTS OF THE INVENTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

As shown in FIGS. 1 to 4, the present disclosure provides a display device 100. The display device 100 is a liquid crystal display device. The display device 100 has a first display mode and a second display mode. A viewing angle of the first display mode is less than a viewing angle of the second display mode. The first display mode is a privacy mode corresponding to a narrow viewing angle, and the second display mode is a normal mode or a sharing mode corresponding to a wide viewing angle. The display device 100 includes a display module 10, a dimming device and a backlight module 30, and the display module 10 is located between the dimming device 20 and the backlight module 30.

Figure 1:
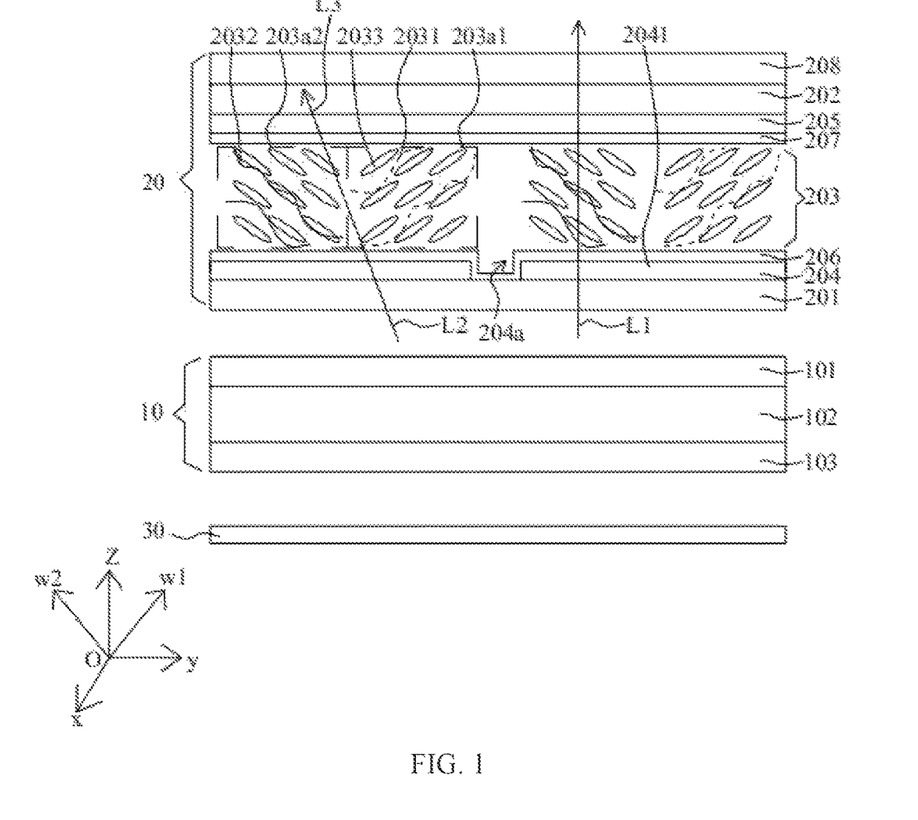
FIG. 1 is a schematic cross-sectional view of the display device in a first display mode according to a first embodiment of the application.

In this embodiment, the display module 10 includes a first polarizer 101, a display panel 102, and a third polarizer 103. The display panel 102 is located between the first polarizer 101 and the third polarizer 103. The first polarizer 101 is disposed at a light-emitting side of the display panel 102, the third polarizer 103 is disposed at a light-incidencing side of the display panel 102, and the first polarizer 101 and the third polarizer 103 are attached to opposite sides of the display panel 102, respectively. A transmission axis of the first polarizer 101 is perpendicular to a transmission axis of the third polarizer 103, the transmission axis of the first polarizer 101 is parallel to a y-axis direction (horizontal direction), and the transmission axis of the third polarizer 103 is parallel to an x-axis, and the x-axis is perpendicular to the y-axis. The display panel 102 is a conventional display panel, the display panel 102 cooperates with the first polarizer 101 and the third polarizer 103 to realize display, and the display panel 102 will not be described in detail here.

In this embodiment, the dimming device 20 has a first state and a second state. When the display device 100 is in the first display mode, the dimming device 20 is in the first state. When the display device 100 is in the second display mode, the dimming device 20 is in the second state. The dimming device 20 includes a first substrate 201, a second substrate 202, a first electrode layer 204, a second electrode layer 205, a dimming layer 203, a first alignment layer 206, a second alignment layer 207, and a second polarizer 208.

In this embodiment, the first substrate 201 is disposed on a side of the first polarizer 101 away from the display panel 102, the second substrate 202 is disposed on a side of the first substrate 201 away from the display panel 102, and the first substrate 201 and the second substrate 201 are arranged opposite. Both the first substrate 201 and the second substrate 202 are glass substrates. It can be understood that, both the first substrate 201 and the second substrate 202 may also be polymer substrates, such as polyimide substrate.

In this embodiment, the second polarizer 208 is located on a side of the second substrate 202 away from the first substrate 201. A transmission axis of the second polarizer 208 is parallel to the transmission axis of the first polarizer 101, that is, the transmission axis of the second polarizer 208 is also parallel to the y-axis direction, and the second polarizer 208 is attached to the second substrate 202. It is understandable that, the first polarizer 101 can also be used as a part of the dimming device 20 and attached to the first substrate 201.

In this embodiment, the dimming layer 203 is filled between the first substrate 201 and the second substrate 202. Therefore, the dimming layer 203 is also disposed on the light-emitting side of the display panel 102, and the second polarizer 208 is positioned on a side of the dimming layer 203 away from the first polarizer 101. The dimming layer 203 has at least one first area 203a1 and at least one second area 203a2 alternately arranged in a first direction, and the first direction is perpendicular to a thickness direction of the dimming layer 203.

Specifically, a number of the first area 203a1 and a number of the second area 203a2 are plurality, the first direction is the y-axis direction, the thickness direction of the dimming layer 203 is the z-axis direction. The z-axis direction is perpendicular to the y-axis direction and the x-axis direction, the plurality of the first areas 203a1 and the plurality of the second areas 203a2 are alternately arranged in the y-axis direction, and the first area 203a1 and the second area 203a2 have same size in the first direction.

In this embodiment, the dimming layer 203 includes a first polymer network liquid crystal and a second polymer network liquid crystal. The first polymer network liquid crystal is disposed in the first area 203a1 of the dimming layer 203, and the second polymer network liquid crystal is disposed in the second area 203a2 of the dimming layer 203. The first polymer network liquid crystal includes a first polymer network 2031 arranged along the second direction w1 and liquid crystal molecules 2033 distributed in the first polymer network 2031. The second polymer network includes a second polymer network 2032 arranged along the third direction w2 and liquid crystal molecules 2033 distributed in the second polymer network 2032. Both the second direction w1 and the third direction w2 are inclined relative to a normal line of the first polarizer 101, the third direction w2 and the second direction w1 are point to opposite sides of the normal line of the first polarizer 101 respectively, and the third direction w2 and the second direction w1 are both parallel to a plane zOy defined by the first direction and the thickness direction of the dimming layer, the normal line of the first polarizer 101 is parallel to the z-axis direction and points to the z-axis direction. An angle between the second direction w1 and the normal line direction of the first polarizer 101 is greater than 0 degrees and less than 90 degrees, and an angle between the third direction w2 and the normal line direction of the first polarizer 101 is greater than 0 degrees and less than 90 degrees. For example, the angle between the second direction w1 and the normal line direction of the first polarizer 101 is 20 degrees, 30 degrees, 40 degrees, 50 degrees, 60 degrees, 70 degrees, or 80 degrees, and the angle between the third direction w2 and the normal line direction of the first polarizer 101 is 20 degrees, 30 degrees, 40 degrees, 50 degrees, 60 degrees, 70 degrees, or 80 degrees.

It can be understood that, the angles between the third direction w2 and the second direction w1 and the plane defined by the first direction and the thickness direction of the dimming layer are greater than 0 degrees and less than 90 degrees, such as 30 degrees, 40 degrees, 50 degrees or 60 degrees.

It should be noted that, since the third direction w2 and the second direction w1 respectively point to opposite sides of the normal line of the first polarizer 101, one first polymer network 2031 locating in one first area 203a1 and arranging along the second direction w1 and one second polymer network 2032 disposed in an adjacent second area 203a2 and arranging along a third direction w2 is inclined toward each other. The first polymer network 2031 being arranged in the first area 203a1 and along the second direction w1 and the second polymer network 2032 being arranged in another adjacent second area 203a2 and along a third direction w2 are inclined backward each other. Wherein, the first polymer network 2031 inclined towards to the second polymer network 2032 means that when the first polymer network 2031 is inclined to a side near the second polymer network 2032, the second polymer network 2032 is also inclined to a side near the first polymer network 2031. The first polymer network 2031 inclined backwards to the second polymer network 2032 means that when the first polymer network 2031 is inclined to a side away from the second polymer network 2032, the second polymer network 2032 is also inclined to a side away from the first polymer network 2031.

In this embodiment, one of the first electrode layer 204 and the second electrode layer 205 is located between the first polarizer 101 and the dimming layer 203, and the other of the first electrode layer 204 and the second electrode layer 205 is located between the second polarizer 208 and the dimming layer 203. A material of the first electrode layer 204 and the second electrode layer 205 are both indium tin oxide.

Wherein, the first electrode layer 204 includes a plurality of first electrodes spaced and arranged in a first direction. There is a gap 204a between two adjacent first electrodes 2041. Each first electrode 2041 is arranged corresponding to an adjacent one first area 203a1 and one second area 203a2. A first polymer network 2031 disposed in the second direction w1 and corresponded to one first electrode 2041 and a second polymer network 2032 disposed in a third direction w2 are inclined backwards each other. Corresponding to two adjacent first electrodes 2041, the first polymer network 2031 and the second polymer network 2032 incline to the gap 204a between the two first electrodes 2041 and incline toward each other. A size of the gap 204a between any two adjacent first electrodes 2041 in the first direction is less than a size of one first electrode 2041. The second electrode layer 205 is disposed opposite to the first electrode layer 204, and the second electrode layer 205 is an electrode on an entire surface.

Specifically, the first electrode layer 204 is located between the first polarizer 101 and the dimming layer 203, the first electrode layer 204 is disposed on the first substrate 201 and between the first substrate 201 and the dimming layer 203, and the second electrode layer 205 is located between the second polarizer 208 and the dimming layer 203, and the second electrode layer 205 is disposed on the second substrate 202 and between the second substrate 202 and the dimming layer 203.

In this embodiment, the first electrode layer 204 and the second electrode layer 205 are used to apply a voltage to the dimming layer 203, so that long axes of at least part of the liquid crystal molecules 2033 distributed in the first polymer network 2031 are switched between the second directions w1 and a fourth direction, and long axes of at least part of the liquid crystal molecules 2033 distributed in the second polymer network 2032 are switched between the third direction w2 and a fifth direction.

In this embodiment, as shown in FIG. 1, when the display device 100 is in the first display mode, the dimming device 20 is in the first state, and a voltage difference between the first electrode layer 204 and the second electrode layer 205 is less than a preset threshold value.

Specifically, when the display device 100 is in the first display mode, no voltage is applied on the first electrode layer 204 and the second electrode layer 205, and an electric field corresponding to a voltage between the first electrode layer 204 and the second electrode layer 205 will not applied an electric field force on the liquid crystal molecules 2033 in the dimming layer 203, and the liquid crystal molecules 2033 distributed in the first polymer network 2031 are only subjected to a directional force of the first polymer network 2031, so that the long axes of the liquid crystal molecules 2033 distributed in the first polymer network 2031 are arranged along the second direction w1, and at this time, since the second direction w1 is parallel to the plane defined by the first direction and the thickness direction of the dimming layer, an orthographic projection of the long axes of the liquid crystals molecules 2033 distributed in the first polymer network 2031 on the first polarizer 101 are parallel to the transmission axis of the first polarizer 101; at the same time, the liquid crystal molecules 2033 distributed in the second polymer network 2032 are only subjected to a directional force of the second polymer network 2032, the long axes of the liquid crystal molecules 2033 distributed in the second polymer network 2032 are arranged along the third direction w2, and at this time, since the third direction w2 is parallel to the plane defined by the first direction and the thickness direction of the dimming layer, and an orthographic projection of the long axes of the liquid crystal molecules 2033 distributed in the second polymer network 2032 on the first polarizer 101 are parallel to the transmission axis of the first polarizer 101.

Therefore, when the display device 100 is in the first display mode, the liquid crystal molecules 2033 arranged corresponding to one first electrode 2041 and the long axes arranged along the third direction w2 are inclined backwardly to the liquid crystal molecules 2033 with the long axes arranged along the second direction w1, that is, the liquid crystal molecules 2033 with long axes arranged along the third direction w2 are inclined in a direction away from the liquid crystal molecules 2033 with long axes arranged in the second direction w1, and the liquid crystal molecules 2033 with long axes arranged along the second direction w1 are inclined in a direction away from the liquid crystal molecules 2033 with long axes arranged in the third direction w2; and the liquid crystal molecules 2033 arranged corresponding to the two adjacent first electrodes 2041 are inclined towards the liquid crystal molecules 2033 with the long axes arranged along the third direction w2. That is, the liquid crystal molecules 2033 with long axes arranged in the second direction w1 are inclined to the gap 204a close to the first area 203a1, and the liquid crystal molecules 2033 with long axes arranged in the third direction w2 are inclined to the gap 204a close to the second area 203a2, so that the liquid crystal molecules 2033 with long axes arranged along the second direction w1 and the liquid crystal molecules 2033 with long axes arranged along the third direction w2 form a dual-domain liquid crystal layer, thereby, a normal display of the normal line direction of the display surface of the display device 100 (front viewing angle) is ensured, and a difference of the anti-peeping effect of the display device at different positions in the first direction is also improved.

In this embodiment, in order to further improve a difference of the privacy effect of the display device at different positions in the first direction, a difference between the angle formed between the second direction w1 and the normal line of the first polarizer 101 and the angle formed between the third direction w2 and the normal line of the first polarizer 101 is less than or equal to 10 degrees. For example, the difference between the angle formed by the second direction w1 and the normal line of the first polarizer 101 and the angle formed by the third direction w2 and the normal line of the first polarizer 101 is 8 degrees, 7 degrees, 6 degrees, 5 degrees, 4 degrees, 2 degrees, 1 degree, etc.

Further, the second direction w1 and the third direction w2 are symmetric with respect to the normal line of the first polarizer 101, that is, the angle between the second direction w1 and the normal line of the first polarizer 101 is equal to or tends to be equal to the angle between the third direction w2 and the normal line of the first polarizer 101, so that the anti-peeping effect of the display device at different positions in the first direction is consistent.

It should be noted that, as shown in FIG. 1, a propagation direction of the first light L1 emitted from the first polarizer 101 of the display module 10 is parallel to the normal line of the first polarizer 101, and a polarization direction of the first light L1 is parallel to the transmission axis of the first polarizer 101, the polarization direction of the first light L1 only passes through the long axes of the liquid crystal molecule 2033, the dimming layer 203 does not adjust phase of the first light L1, and the first light L1 will not produce phase difference after passing through the dimming layer 203. The polarization direction of the first ray L1 after passing through the dimming layer 203 is still parallel to the y-axis, and the first ray L1 passes through the transmission axis of the second polarizer 208, thereby, ensure a normal display of the normal line direction (front viewing angle) of the display surface of the display device 100. The propagation direction of the second light L2 emitted from the first polarizer 101 of the display module 10 is inclined with respect to the normal line (z-axis direction) of the first polarizer 101, and the second light L2 is in the xOz plane. The polarization direction of the light L2 is parallel to the transmission axis of the first polarizer 101 and has a certain angle with the long axis of the liquid crystal molecule 2033. The dimming layer 203 performs phase adjustment processing on the second light L2, so that the polarization direction of the second light L2 is deflected and becomes a third light L3. When the polarization direction of the third light L3 is perpendicular to the y-axis, the third light L3 is blocked by the second polarizer 208. When the polarization direction of the third light L3 forms a certain angle with the y-axis and forms a certain angle with the x-axis, part of the third light L3 is blocked by the second polarizer 208 and part of the third light L3 passes through the second polarizer 208, that is, the second light L2 whose polarization direction been adjusted or the part of the second light L2 is blocked by the second polarizer 208, resulting in a low transmittance of light in the xOz plane and a propagation direction deviating from the normal line direction of the first polarizer 101. The display device 100 has a best anti-peeping effect in the x-axis direction and deviating from the front viewing angle.

Figure 2:
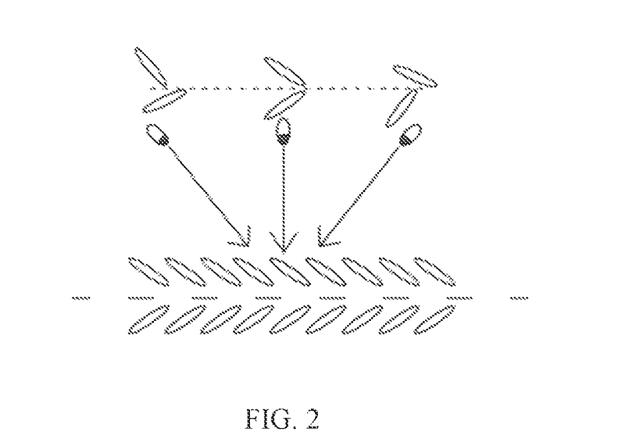
FIG. 2 is a schematic diagram of a dimming layer in the display device shown in FIG. 1 viewed from different positions in the y-axis direction.
Figure 6:
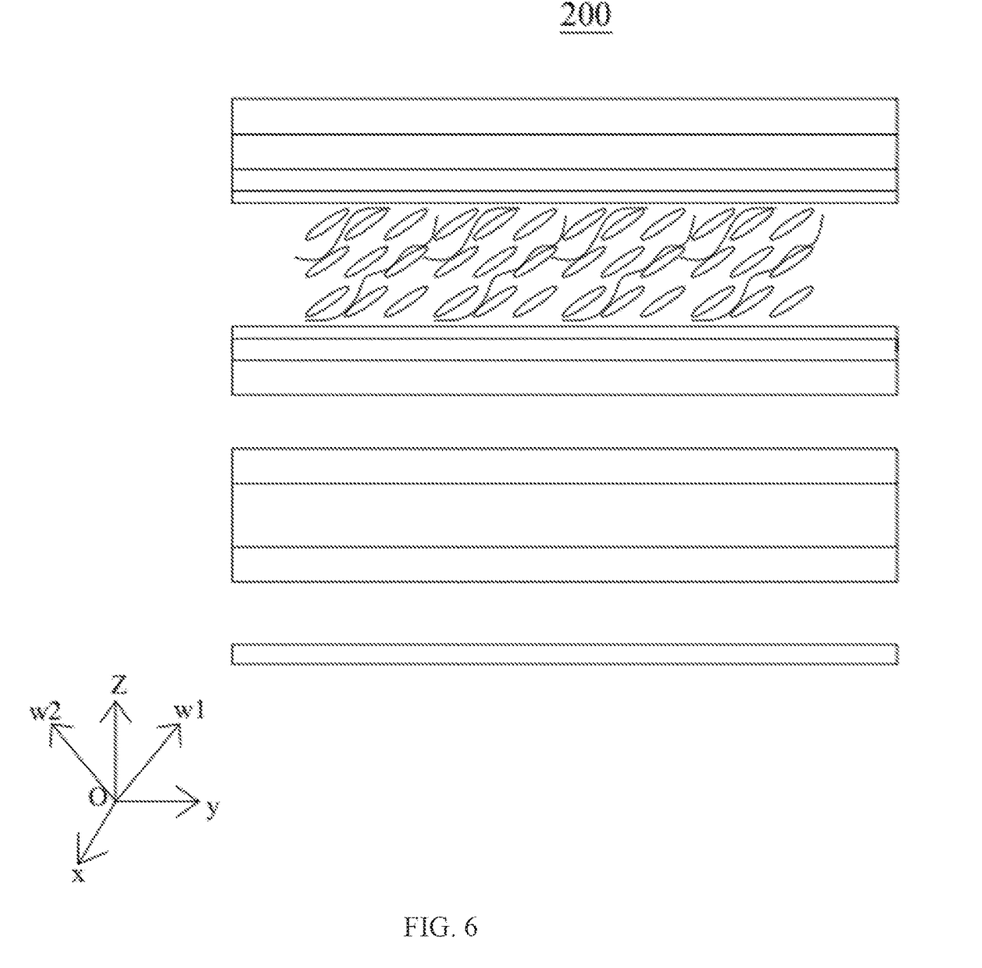
FIG. 6 is a schematic cross-sectional view of a display device of a comparative example.
Figure 7:
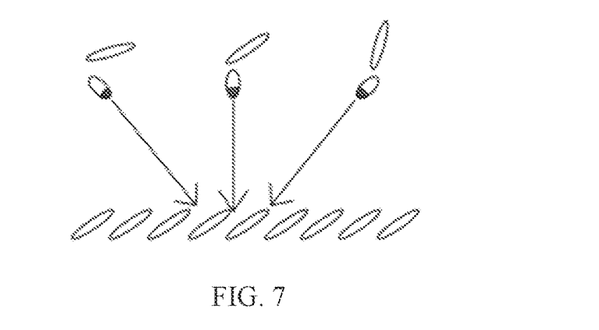
FIG. 7 is a schematic diagram of the display device shown in FIG. 6 viewed from different positions in the y-axis direction.

In addition, as shown in FIGS. 6 and 7, FIG. 6 is a schematic cross-sectional view of the display device of the comparative example, FIG. 7 is a schematic view of the display device shown in FIG. 6 viewed from different positions in the y-axis direction, and the display device 200 shown in FIG. 6 is basically similar to the display device shown in FIG. 1, except that when the display device 200 is in a first display mode, the dimming layer includes a single-domain liquid crystal layer. Due to a birefringence of liquid crystal molecules, the liquid crystal molecules are not consistent when observed at three different positions in the first direction (y-axis direction). Correspondingly, the phase adjustment effect of the dimming layer is also not consistent. In the first direction of the different positions and in the x-axis direction away from the positive angle, the anti-peeping effect gradually decreases. In the application embodiment, as shown in FIG. 2, when the display device is in the first display mode, since the liquid crystal molecules 2033 with the long axes being arranged along the second direction w1 in the dimming layer 203 are symmetrical with the liquid crystal molecules 2033 with long axes being arranged along the third direction w2 respecting to the normal line of the first polarizer 101, the birefringence effect of liquid crystal molecule 2033 are observed in different positions in the first direction. Correspondingly, the phase compensation effect of the dimming layer 203 at different positions in the first direction is the same. The liquid crystal molecule 2033 in the dimming layer 203 has a good self-compensation effect, which makes the anti-peeping effect of the display device in different positions in the first direction and deviating from the right angle in the x-axis direction consistent, the embodiment shows that the device 100 has better anti-peeping effect.

In addition, in conjunction with FIG. 2 and FIG. 7, it can be seen that when the third direction w2 and the second direction w1 respectively point to opposite sides of the normal line of the first polarizer 101, it is beneficial to improve the difference of the anti-peeping effect in the first direction, and the smaller the difference between the angle formed by the second direction w1 and the normal line of the first polarizer 101 and the angle formed by the third direction w2 and the normal line of the first polarizer 101, then the difference of the anti-peeping effect at different positions in the first direction and deviating from the front viewing angle in the x-axis direction is smaller. When the second direction w1 and the third direction w2 are symmetrical with respect to the normal line of the first polarizer 101, a consistency of the anti-peeping effect is best for different positions in the first direction and deviation from the front viewing angle in the x-axis direction.

If the display device is rectangular, and the first direction is a length direction of the display device of this embodiment, the width direction of the display device and the direction away from the positive front viewing angle has a good anti-peeping effect, and the anti-peeping effect of different positions of the display device is consistent in the length direction of the display device. It can be understood that the first direction may be a width direction of the display device, in this case the embodiment shows that the display device of this embodiment has good anti-peeping effect on the length direction of the display device and the direction deviating from the front viewing angle, and the anti-peeping effect of different positions of the display device in the width direction is consistent.

Figure 3:
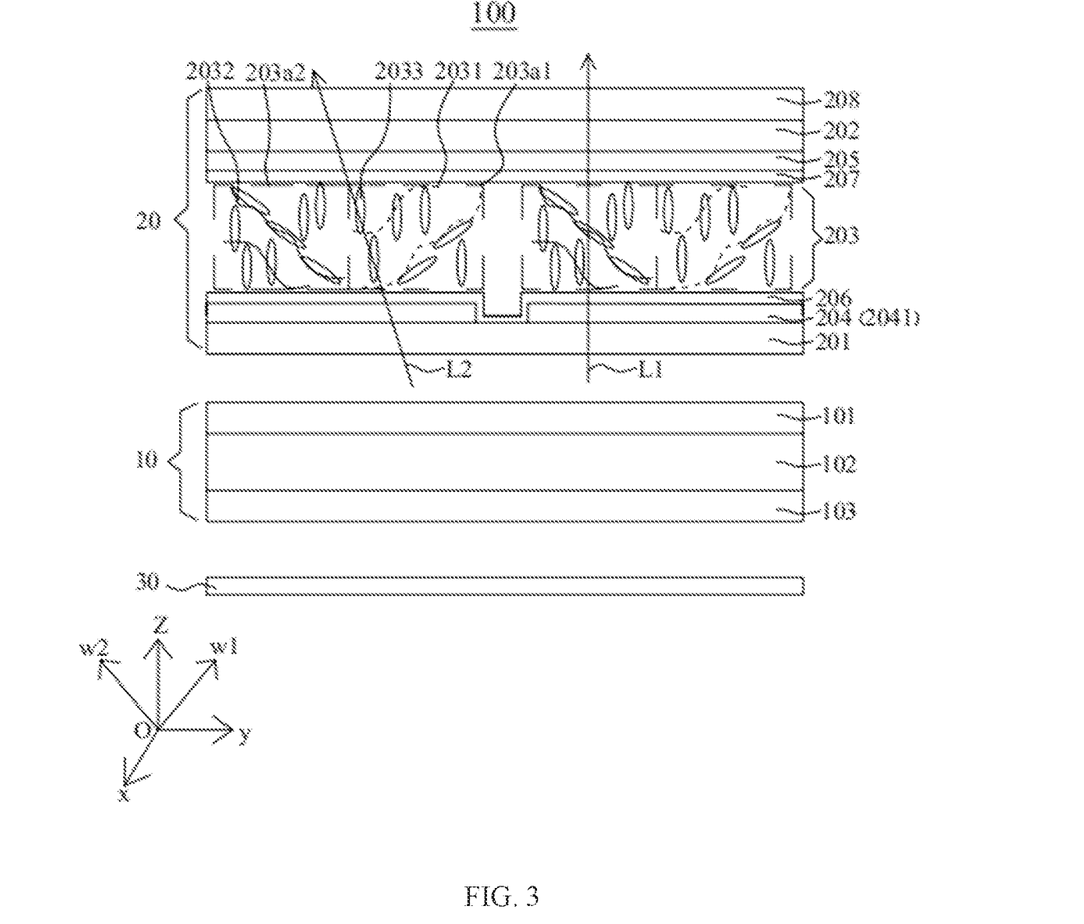
FIG. 3 is a first cross-sectional schematic diagram of the display device in a second display mode according to the first embodiment of the application.

In this embodiment, as shown in FIG. 3, when the display device 100 is in the second display mode, the dimming device 20 is in the second state, and when the voltage difference between the first electrode layer 204 and the second electrode layer 205 is greater than or equal to the preset threshold, the electric field corresponding to the voltage between the first electrode layer 204 and the second electrode layer 205 will exert an electric field force on the liquid crystal molecules 2033 in the dimming layer 203.

Specifically, when the display device 100 is in the second display mode, at least part of the liquid crystal molecules 2033 distributed in the first polymer network 2031 are more affected by the electric field force than by the orientation of the first polymer network 2031 because they are arranged far away from the first polymer network 2031, the long axes of the at least part of the liquid crystal molecules 2033 distributed in the first polymer network 2031 are deflected from a second direction w1 to a fourth direction under the action of the electric field force. The fourth direction is different from the second directions w1 and the third direction w2. The other small amount of the liquid crystal molecules 2033 distributed in the first polymer network 2031 and closer A small amount of other liquid crystal molecules 2033 distributed in the first polymer network 2031 and closer to the first polymer network 2031 do not deflect because the orientation of the first polymer network 2031 is greater than the electric field force. The long axes of the small amount of the liquid crystal molecules 2033 are still arranged along the second direction w1; at the same time, at least part of the liquid crystal molecule 2033 distributed in the second polymer network 2032 and far away from the second polymer network 2032 subject an electric field force greater than the directional effect of the second polymer network 2032, the long axes of the at least part of the liquid crystal molecule 2033 distributed in the second polymer network 2032 are deflected from a third direction w2 to a fifth direction under the action of an electric field force, the fifth direction is different from the second direction w1 and the third direction w2, other small amounts of liquid crystal molecules 2033 distributed in the second polymer network 2032 and closer to the second polymer network 2032 do not deflect because the orientation effect of the second polymer network 2032 is greater than the force of the electric field. The long axes of this small amount of liquid crystal molecules 2033 are still set along the third direction w2.

Therefore, when the display device 100 is in the second display mode, the dimming layer 203 includes a small amount of liquid crystal molecules 2033 closing to the first polymer network 2031 and with long axes are arranged along the third direction w2, a small amount of liquid crystal molecules 2033 closing to the second polymer network 2032 and with long axes arranged along the third direction w1, a large number of liquid crystal molecules 2033 away from the first polymer network 2031 with long axes arranged in the fourth direction, and a large number of liquid crystal molecules away from the second polymer network 2032 with long axes arranged in the fifth direction. The dimming layer 203 does not adjust the phase of the light passing through it, the refractive index of the dimming layer 203 is non-uniform, and the dimming layer 203 scatters the light passing through it, so that the light emitted from the display device 100 is diffused, and the display device 100 can provide a better wide viewing angle display effect in the second display mode.

Figure 4:
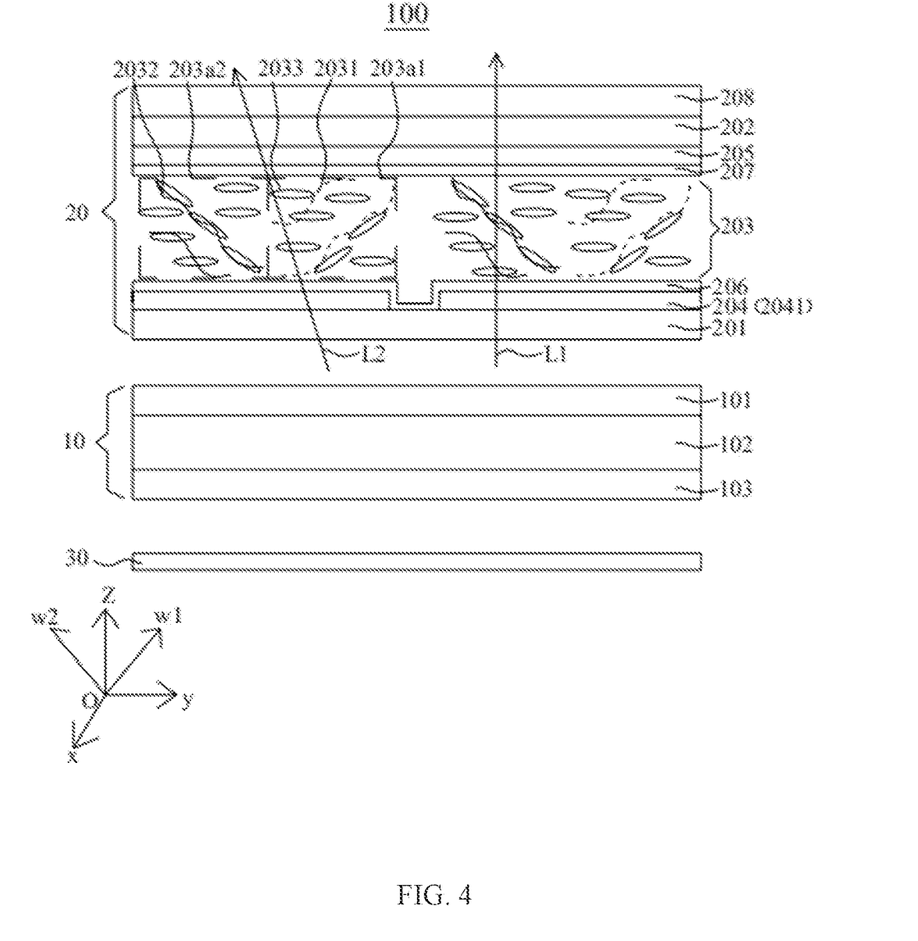
FIG. 4 is a second schematic cross-sectional view of the display device in a second display mode according to the first embodiment of the application.

In this embodiment, the fourth direction is the same as the fifth direction, and the fourth direction is parallel or perpendicular to the normal line of the first polarizer 101. Specifically, as shown in FIG. 3, when the liquid crystal molecules 2033 are positive liquid crystal molecules, the fourth direction is parallel to the normal line of the first polarizer 101, that is, the fourth direction is the vertical direction (parallel to the z axis). As shown in FIG. 4, when the liquid crystal molecules 2033 are negative liquid crystal molecules, the fourth direction is perpendicular to the normal line of the first polarizer 101, that is, the fourth direction is the horizontal direction (vertical to the z axis). It can be understood that the fourth direction and the fifth direction may also be different.

In this embodiment, the first alignment layer 206 is disposed on a surface of the first electrode layer 204 close to the second substrate 202, and the second alignment layer 207 is disposed on a surface of the second electrode layer 205 close to the first substrate 201. The long axes of the liquid crystal molecules 2033 distributed in the first polymer network 2031 are set along the second direction w1 after aligned by the first alignment layer 206 and the second alignment layer 207, and the long axes of the liquid crystal molecules 2033 distributed in the second polymer network 2032 are set along the third direction w2 after aligned by the first alignment layer 206 and the second alignment layer 207.

In this embodiment, the backlight module 30 is a collimated backlight source, and the collimated backlight source is located on a side of the third polarizer 103 away from the display panel 102. The backlight module 30 provides a collimated backlight source for the display panel 102.

Figure 5:
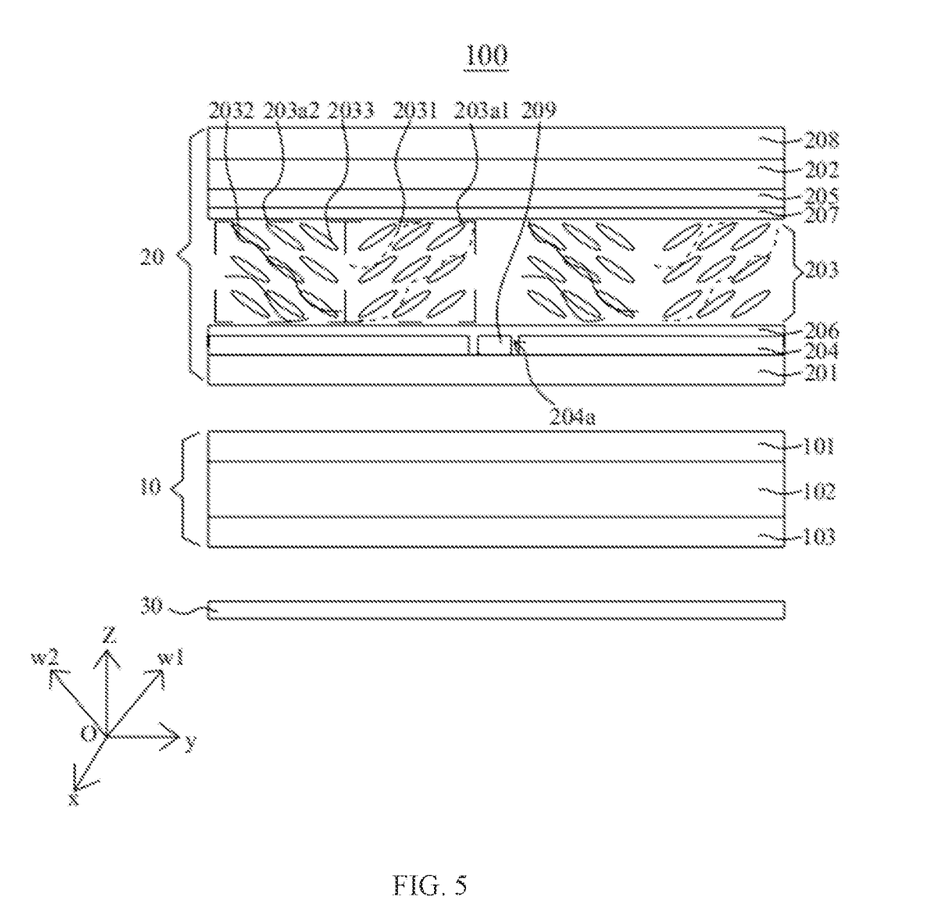
FIG. 5 is a schematic cross-sectional view of the display device in the first display mode according to a second embodiment of the application.

As shown in FIG. 5, FIG. 5 is a schematic cross-sectional view of the display device according to the second embodiment of the application. The display device shown in FIG. 5 is basically similar to the display device shown in FIG. 1, except that the dimming device 20 further includes at least one third electrode 209, and the at least one third electrode 209 is disposed on a surface of the first substrate 201 close to the second substrate 202. The at least one third electrode 209 is arranged in the same layer as the first electrode layer 204, and each third electrode 209 is arranged at a gap 204a between two adjacent first electrodes 2041. A size of the third electrode 209 located between two adjacent first electrodes 2041 in the first direction (y-axis direction) is less than a size of the first electrode 2041 in the first direction, to provide conditions for an arc-shaped electric field between each third electrode 209 and the adjacent first electrode 2041.

When aligning the liquid crystal molecules 2033, the voltage of the third electrode 209 is independently regulated, a slanted electric field is formed between the first electrode layer 204 and the second electrode layer 205, and to match each third electrode 209 to form an arc-shaped electric field with the adjacent first electrode 2041, to improve the driving and adjusting ability of the liquid crystal molecules 2033, so that a pretilt angle of the liquid crystal molecules 2033 after the alignment is adjustable.

In addition, when the display device is in the second display mode, a voltage applied to the third electrode 209 is the same as a voltage applied to the first electrode layer 204, so that when a voltage is applied between the first electrode layer 204 and the second electrode layer 205 to deflect the liquid crystal molecules 2033 in the dimming layer 203, the electric field formed between the third electrode 209 and the second electrode layer 205 can also drive the liquid crystal molecules 2033 in the dimming layer 203 to deflect, further ensuring that the liquid crystal molecules 2033 can be deflected to a target state in the second display mode It should be noted that, preparation materials of the first polymer network 2031 and the second polymer network 2032 include polymer monomers, before aligning the liquid crystal molecules 2033, the polymer monomer and the liquid crystal molecules 2033 form a mixture. During the alignment process of the liquid crystal molecules 2033, the long axes of the liquid crystal molecules 2033 in the mixture are respectively arranged along the second direction w1 and the third direction w2 under the combined action of the inclined electric field formed between the first electrode layer 204 and the second electrode layer 205 and the arc-shaped electric field formed between the first electrode layer 204 and the third electrode 209. Correspondingly, the polymer monomers in the mixture are arranged along the second direction w1 and the third direction w2 under the orientation force of the liquid crystal molecules 2033. After curing using an ultraviolet light, a first polymer network 2031 arranged along the second direction w1 and a second polymer network 2032 arranged along the third direction w2 are formed. A first polymer network liquid crystal is formed by the first polymer network 2031 arranged along the second direction w1 and the liquid crystal molecules 2033 distributed in the first polymer network 2031, and the second polymer network liquid crystal is formed by the second polymer network 2032 arranged along the third direction w2 and the liquid crystal molecules 2033 distributed in the second polymer network 2032 constitute.

The foregoing embodiments are merely some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A display device, comprising:
   a display panel;
   a first polarizer, located on a light-emitting side of the display panel;
   a dimming layer, disposed on a side of the first polarizer away from the display panel, wherein the dimming layer comprises at least one first area and at least one second area alternately arranged along a first direction, the first direction is perpendicular to a thickness direction of the dimming layer, the thickness direction of the dimming layer is a direction of the dimming layer pointed to the first polarizer, and the dimming layer comprises:
   a first polymer network liquid crystal, located in the first area of the dimming layer and comprising a first polymer network arranged along a second direction and liquid crystal molecules distributed in the first polymer network, wherein the second direction is inclined with respect to the normal line of the first polarizer; and
   a second polymer network liquid crystal, located in the second area of the dimming layer and comprising a second polymer network arranged along a third direction and liquid crystal molecules distributed in the second polymer network, wherein the third direction is inclined with respect to the normal line of the first polarizer, and the third direction and the second direction point to opposite sides of the normal line of the first polarizer, the third direction and the second direction are parallel to a plane defined by the first direction and the thickness direction of the dimming layer; and
   a second polarizer is located on a side of the dimming layer away from the first polarizer, and a light transmission axis of the second polarizer is parallel to a light transmission axis of the first polarizer;
   wherein in a case that the display device is in a first display mode, long axes of the liquid crystal molecules distributed in the first polymer network are arranged along the second direction and long axes of the liquid crystal molecule distributed in the second polymer network are arranged along the third direction.

2. The display device in claim 1, wherein in a case that the display device is in a second display mode, long axes of at least part of the liquid crystal molecules distributed in the first polymer network are arranged along a fourth direction, and long axes of at least part of the liquid crystal molecules distributed in the second polymer network are arranged along a fifth direction, the fourth direction is different from the second direction and the third direction, and the fifth direction is different from the second direction and the third direction, and a visual angle of view of the first display mode is less than a visual angle of view of the second display mode.

3. The display device in claim 2, wherein the display device further comprises:
   a first electrode layer comprising a plurality of first electrodes arranged at intervals and along the first direction, wherein a gap is formed between two adjacent first electrodes, and each first electrode is arranged corresponding to the first area and the second area adjacent to each other; and
   a second electrode layer arranged opposite to the first electrode layer;
   wherein one of the first electrode layer and the second electrode layer is located between the first polarizer and the dimming layer, and the other of the first electrode layer and the second electrode layer is located between the second polarizer and the dimming layer;
   the first electrode layer and the second electrode layer are used to apply a voltage to the dimming layer so that the long axes of at least part of the liquid crystal molecules distributed in the first polymer network are switched between the second direction and the fourth direction, and the long axes of at least part of the liquid crystal molecules distributed in the second polymer network are switched between the third direction and the fifth direction.

4. The display device in claim 3, wherein the display device further comprises:
at least one third electrode arranged in the same layer as the first electrode layer, and each of the third electrodes is arranged in the gap between two adjacent first electrodes, and a dimension of the third electrode in the first direction is less than a dimension of the first electrode in the first direction.

5. The display device in claim 4, wherein in a case that the display device is in the second display mode, the third electrode is loaded with the same voltage as the first electrode layer.

6. The display device in claim 1, wherein a difference between an angle formed between the second direction and the normal line of the first polarizer and an angle formed between the third direction and the normal line of the first polarizer is less than or equal to 10 degrees.

7. The display device in claim 6, wherein the second direction and the third direction are symmetric with respect to the normal line of the first polarizer.

8. The display device in claim 2, wherein the fourth direction is the same as the fifth direction, and the fourth direction is parallel to or perpendicular to the normal line of the first polarizer.

9. The display device in claim 1, wherein the display device further comprises:
a third polarizer positioned on a side of the display panel away from the first polarizer, wherein a transmission axis of the third polarizer is perpendicular to the transmission axis of the first polarizer.

10. The display device in claim 9, wherein the display device further comprises:
a collimated backlight located on one side of the third polarizer away from the display panel.

11. The display device in claim 1, wherein the first direction is a length direction or a width direction of the display device.

12. The display device in claim 1, wherein in the case that the display device is in the first display mode, orthographic projections of the long axes of the liquid crystal molecules distributed in the first polymer network on the first polarizer are parallel to the transmission axis of the first polarizer, and orthographic projections of the long axes of the liquid crystal molecules distributed in the second polymer network on the first polarizer are parallel to the transmission axis of the first polarizer.

13. A dimming device, the dimming device having a first mode, and the dimming device comprising:
a first polarizer;
a dimming layer, arranged on a side of the first polarizer, and the dimming layer comprising at least one first area and at least one second area alternately arranged along a first direction, wherein the first direction is perpendicular to a thickness direction of the dimming layer, the thickness direction of the dimming layer is a direction of the dimming layer pointed to the first polarizer; and the dimming layer comprises:
a first polymer network liquid crystal, located in the first area of the dimming layer and comprising a first polymer network arranged along a second direction and liquid crystal molecules distributed in the first polymer network, wherein the second direction is inclined with respect to the normal line of the first polarizer; and
a second polymer network liquid crystal, located in the second area of the dimming layer and comprising a second polymer network arranged along a third direction and liquid crystal molecules distributed in the second polymer network, the third direction is inclined with respect to the normal line of the first polarizer, and the third direction and the second direction point to opposite sides of the normal line of the first polarizer, the third direction and the second direction are parallel to a plane defined by the first direction and the thickness direction of the dimming layer; and
a second polarizer, located on a side of the dimming layer away from the first polarizer, wherein a light transmission axis of the second polarizer is parallel to a light transmission axis of the first polarizer;
wherein in a case that the dimming device is in the first mode, long axes of the liquid crystal molecules distributed in the first polymer network are arranged along the second direction, and long axes of the liquid crystal molecule distributed in the second polymer network are arranged along the third direction.

14. The dimming device in claim 13, wherein the dimming device further has a second mode, and in a case that the dimming device is in the second mode, long axes of at least part of the liquid crystal molecules distributed in the first polymer network are arranged along a fourth direction, and long axes of at least part of the liquid crystal molecules distributed in the second polymer network are arranged along a fifth direction, the fourth direction is different from the second direction and the third direction, and the fifth direction is different from the second direction and the third direction.

15. The dimming device in claim 14, wherein the dimming device further comprises:
a first electrode layer, comprising a plurality of first electrodes arranged at intervals and along the first direction, wherein a gap is formed between two adjacent first electrodes, and each first electrode is arranged corresponding to the first area and the second area adjacent to each other; and
a second electrode layer arranged opposite to the first electrode layer;
wherein one of the first electrode layer and the second electrode layer is located between the first polarizer and the dimming layer, and the other of the first electrode layer and the second electrode layer is located between the second polarizer and the dimming layer;
the first electrode layer and the second electrode layer are used to apply a voltage to the dimming layer so that the long axes of at least part of the liquid crystal molecules distributed in the first polymer network are switched between the second direction and the fourth direction, and the long axes of at least part of the liquid crystal molecules distributed in the second polymer network are switched between the third direction and the fifth direction.

16. The dimming device described in claim 13, wherein a difference between an angle formed between the second direction and the normal line of the first polarizer and an angle formed between the third direction and the normal line of the first polarizer is less than or equal to 10 degrees.

17. The dimming device in claim 16, wherein the second direction and the third direction are symmetric with respect to the normal line of the first polarizer.

18. The dimming device in claim 14, wherein the fourth direction is the same as the fifth direction, and the fourth direction is parallel to or perpendicular to the normal line of the first polarizer.

19. The dimming device in claim 13, wherein in the case that the dimming device is in the first mode, orthographic projections of the long axes of the liquid crystal molecules distributed in the first polymer network on the first polarizer are parallel to the transmission axis of the first polarizer, and orthographic projections of the long axes of the liquid crystal molecules distributed in the second polymer network on the first polarizer are parallel to the transmission axis of the first polarizer.

\* \* \* \* \*